May 9, 1967  J. D. M. START  3,319,149
PROTECTIVE CIRCUIT ARRANGEMENT FOR SEMICONDUCTOR
SWITCHES IN STATIC INVERTERS
Filed July 28, 1964
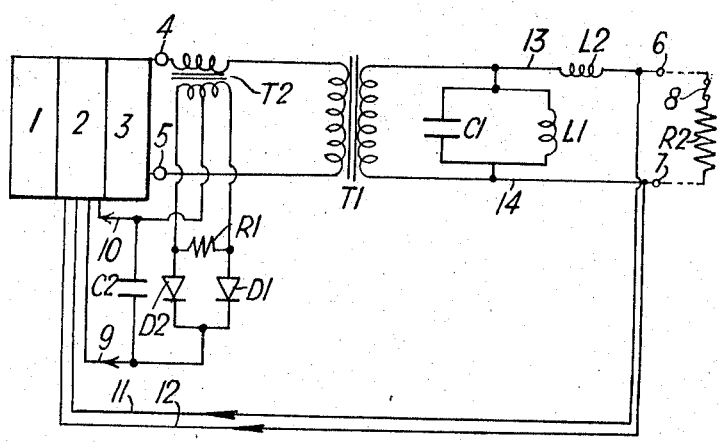
Inventor
JAMES DENNIS MICHAEL START
By
Browne Schuyler Beveridge
Attorney United States Patent Office 3,319,149
Patented May 9, 1967

3,319,149
PROTECTIVE CIRCUIT ARRANGEMENT FOR SEMICONDUCTOR SWITCHES IN STATIC INVERTERS
James D. M. Start, Southend-on-Sea, England, assignor to E. K. Cole Limited, Southend-on-Sea, England
Filed July 28, 1964, Ser. No. 385,601
Claims priority, application Great Britain, Aug. 9, 1963, 31,450/63
5 Claims. (Cl. 321—14)

This invention relates to static inverters in which semiconductor devices are used as switches to convert to A.C., current supplied as D.C.

A disadvantage in such a static inverter as compared with a rotary inverter is that owing to the low thermal capacity and sensitivity to temperature of the semi-conductor switching devices, it is necessary to incorporate circuits with a high speed of response, to protect the semi-conductors from damage if a severe overload or short circuit occurs on the output of the inverter. Since also the stored energy in a static inverter does not compare with that of a rotary machine, the surge of energy available at the output of a static inverter when the output is short-circuited is generally inadequate to melt a fuse of rating comparable with the output rating of the inverter.

A feature of the present invention is a static inverter of the type in which current through its semi-conductors is maintained below a predetermined safe limit, wherein means are provided whereby without increasing the said current beyond said limit, the current in the inverter load circuit is rapidly and automatically increased on the load being short circuited.

Another feature of the invention is a static inverter whose load circuit comprises an overload cut-out and in which an impedance in the said load circuit is adapted, on the load being short circuited, to constitute an effective component of a circuit resonant at a harmonic multiple or overtone of the fundamental frequency of the inverter, to provide substantially instantaneously a large operating current for the cut-out.

In a preferred form and according to another feature of the invention a static inverter circuit comprises a parallel combination of inductance and capacitance connected across the semi-conductor switching circuit and resonant at the fundamental frequency of the inverter, and an additional inductor connected between the said parallel combination and the output terminals of the inverter, the value of the additional inductance being such as to be resonant with the effective capacity of the said combination at a harmonic multiple of the said fundamental frequency.

In the arrangement as above, the current protection circuit for the semi-conductors, which reduces the duration of the pulses fed to the output when the output terminals are short-circuited, is so adjusted that the particular harmonic determining the value of the additional inductance is at maximum.

The above and other features of the invention will be more readily understood by a perusal of the following description having reference to the accompanying drawing, which is a circuit diagram partly in block schematic of an inverter according to the present invention.

In the drawing, the inverter comprises an oscillator stage 1, a regulator stage 2 and a semi-conductor switching stage 3 having output terminals 4 and 5. The function of the regulator stage 2, during normal operation, is to control the output of the inverter by varying the duration of the conducting periods of the switching stage 3 in such a manner as to maintain constant the alternating voltage at the inverter output terminals indicated at 6 and 7. The voltage control signal is fed to the regulator stage via leads 11 and 12. The terminals 4 and 5 are connected to the primary winding of an output transformer T1 via the primary winding of a current transformer T2. The secondary winding of T2 is connected to a network having a resistor R1, a full wave rectifier consisting of diodes D1 and D2, and a capacitor C2, this network providing a voltage across C2 proportional to the peak current in the primary windings of T1 and T2. C2 is connected via leads 9 and 10 to the regulator stage 2 whose characteristics are such that when the voltage applied via these leads exceeds a predetermined level, this voltage overrides the voltage feedback signal applied via the leads 11 and 12 and the inverter output is reduced.

The inverter output terminals 6 and 7 have connected therebetween a load R2 and a fusible cut-out 8. The terminals 6 and 7 are connected to the secondary winding of T1 through leads 13 and 14 respectively. A coil L1 shunted by a capacitor C1 is connected as shown between leads 13 and 14 and a coil L2 is connected on the output side of the L1C1 network.

The network L1C1 is tuned to the frequency ($f$) of the inverter. The value of L2 is chosen such that with R2 short-circuited it constitutes with the combination C1 and L1 a circuit resonant at a harmonic of $f$, i.e. $nf$. At a selected harmonic, $nf$, the combination of C1 and L1 behaves as a capacitor $C3 = C1(1 - 1/n^2)$, and L2 is chosen to be resonant with C3 at the frequency $nf$.

The harmonic selected is one which is present as an appreciable proportion of the output waveform. The impedance of L2 at the frequency $f$ is low compared with the normal full load impedance R2, so that under normal conditions L2 has little effect. If the load R2 is short-circuited, the increased current drawn from the switching stage 3 causes the voltage across C2 to exceed the threshold level at which it overrides the voltage feedback, and the duration of the conducting periods of the switching stage is reduced to a value which is safe for the switching semi-conductors. Under these conditions the fundamental component of the output current is low, but current magnification in the circuit consisting of C3 and L2 now takes place at the harmonic frequency $nf$, so that the RMS current fed into the short circuit is substantially increased, and may now be adequate to melt the fusible cut-out 8 comparable with the inverter rating.

In a further embodiment the current sensing circuit is designed in such a way that the proportion of the selected harmonic is a maximum under short-circuited output conditions. The relative proportions of the different harmonics at the output of an inverter of the type described depends on the "conduction angle" of the semi-conductor switching devices i.e. on the proportion of each cycle during which energy is fed into the filter. The conduction angle with the output short-circuited depends on the value of R1, the turns ratio of T2 and the threshold level in the regulator stage 2. The combination of these quantities may be chosen to give the optimum conduction angle for the generation of the selected harmonic, rather than the maximum conduction angle determined by the semi-conductor ratings.

If desired the invention may be applied to inverters with a plurality of outputs by providing multiple taps on the secondary winding of T2, each leading to an output circuit similar to that described above with suitably proportioned inductors in each output lead.

The transformer T2 may be connected in the portion of the lead 13 between the secondary winding of T1 and the L1C1 network. In such a case, when the inverter has a member of output circuits, the transformer would have a plurality of primary windings, one for each output circuit.

Various modifications may be made in detail without exceeding the scope of the invention. For example in some applications it may be possible to omit the transformer T1, or to incorporate the inductor L1 as part of T1, or to connect the network L1C1 across the primary winding of T1 instead of across its secondary winding.

I claim:

1. In a static inverter, having an overload safety device, an inverter load circuit comprising a network tuned to the fundamental frequency of the inverter and an impedance connected to said network to provide a circuit resonant at a predetermined harmonic multiple of the fundamental frequency of the inverter, means for increasing the ratio of the selected harmonic content in the inverter, a device operating when the current in said load exceeds a predetermined limit to initiate said increase in harmonic content and means for using the thus increased current in the resonant network to operate said overload safety device.

2. In a static inverter of the type in which current through its semi-conductors is maintained below a predetermined safe limit, an inverter load circuit comprising an overload cut-out, a network resonant at the fundamental frequency of the inverter and an impedance effectively connected with the network to provide a circuit resonant at a predetermined harmonic multiple or overtone of the fundamental frequency of the inverter, means for increasing the ratio of the selected harmonic or overtone content in the inverter, a device operating when the current in said load exceeds a predetermined limit to initiate said increase in harmonic or overtone content and means for using the thus increased current in said resonant circuit to operate said overload cut-out.

3. In a static inverter, an inverter load circuit comprising a parallel combination of inductance and capacitance resonant at the fundamental frequency of the inverter, output terminals for the inverter and an additional inductor between said combination and one of said output terminals to resonate with the effective capacity of said combination at a predetermined harmonic frequency or overtone of the fundamental frequency of the inverter, means for increasing the ratio of the selected harmonic or overtone content in the inverter, a device operating when the current in said load exceeds a predetermined limit to initiate said increase in harmonic or overtone content and means for using the resonance at the said harmonic frequency or overtone to increase the current in the said load.

4. A static inverter according to claim 3, comprising an input circuit for said parallel combination, a transformer for said parallel combination, a transformer for said device having a primary winding in said input circuit, a rectifier for said device and means for providing a rectified output proportional to the current in said primary winding.

5. In a static inverter, a load circuit comprising a parallel combination of inductance and capacitance resonant at the fundamental frequency of the inverter, output terminals for the inverter, an inverter load and an overload cut-out serially connected between said output terminals, an additional inductor between said combination and one of said output terminals to resonate with the effective capacity of the said combination at a predetermined harmonic frequency or overtone of the fundamental frequency of the inverter, means for increasing the ratio of the selected harmonic or overtone content in the inverter, a device operating when the current in said load exceeds a predetermined limit to initiate said increase in harmonic or overtone content and means for passing through the said load the circulating current in the resonant network of the said combination and the additional inductor, to operate the said overload cut-out.

References Cited by the Examiner
UNITED STATES PATENTS

| | | | |
|---|---|---|---|
| 3,041,523 | 6/1962 | Kuba | 321—16 |
| 3,229,211 | 1/1966 | Pintell | 323—7 |

JOHN F. COUCH, *Primary Examiner.*

W. M. SHOOP, *Assistant Examiner.*